(12) United States Patent
Xiang et al.

(10) Patent No.: US 12,072,886 B2
(45) Date of Patent: Aug. 27, 2024

(54) METHOD AND DEVICE FOR ACCELERATING DATABASE OPERATION

(71) Applicant: HEFEI SWAYCHIP INFORMATION TECHNOLOGY INC., Anhui (CN)

(72) Inventors: Junling Xiang, Beijing (CN); Min Zhou, Beijing (CN); Ruimin Liu, Beijing (CN)

(73) Assignee: HEFEI SWAY CHIP INFORMATION TECHNOLOGY INC., Anhui (CN)

( * ) Notice: Subject to any disclaimer, the term of this patent is extended or adjusted under 35 U.S.C. 154(b) by 0 days.

(21) Appl. No.: 18/267,215

(22) PCT Filed: Nov. 18, 2021

(86) PCT No.: PCT/CN2021/131504
§ 371 (c)(1),
(2) Date: Jun. 14, 2023

(87) PCT Pub. No.: WO2023/000561
PCT Pub. Date: Jan. 26, 2023

(65) Prior Publication Data
US 2024/0045868 A1    Feb. 8, 2024

(30) Foreign Application Priority Data

Jul. 20, 2021 (CN) .......................... 202110818910.0

(51) Int. Cl.
*G06F 16/2455* (2019.01)
*G06F 16/22* (2019.01)
(Continued)

(52) U.S. Cl.
CPC .... *G06F 16/24552* (2019.01); *G06F 16/2246* (2019.01); *G06F 16/2365* (2019.01); *G06F 16/24542* (2019.01)

(58) Field of Classification Search
CPC ............ G06F 16/2246; G06F 16/2365; G06F 16/2453; G06F 16/24542; G06F 16/24552
See application file for complete search history.

(56) References Cited

U.S. PATENT DOCUMENTS

2008/0189252 A1\* 8/2008 Branscome ......... G06F 16/2453
2009/0254774 A1\* 10/2009 Chamdani ............. G06F 9/4881
707/999.005

(Continued)

FOREIGN PATENT DOCUMENTS

| CN | 102436494 A | 5/2012 |
| CN | 104504018 A | 4/2015 |

(Continued)

OTHER PUBLICATIONS

Tong Su, etc. CAM-based hardware acceleration method for database query. Journal of Information Engineering University.2019, vol. 20 (No. 2).

(Continued)

*Primary Examiner* — James E Richardson
(74) *Attorney, Agent, or Firm* — Schmeiser, Olsen & Watts, LLP

(57) ABSTRACT

A method and device for accelerating database operation, applied to a database connected with a hardware accelerator is provided, the method includes: when receiving an initial execution plan tree sent by the database that needs to be accelerated, processing the initial execution plan tree and generating a new execution plan tree and a new execution cost based on the basic operation and accelerated resource supported by the hardware accelerator; if the new execution cost of the new execution plan tree is less than the initial execution cost of the initial execution plan tree, distributing the new execution plan tree to the hardware accelerator for execution based on the organization approach and the operation approach of the hardware accelerator; the execution (Continued)

result returned by the hardware accelerator to complete the accelerated operation of the database operation; determining the result data after the hardware accelerator accelerates the database operation based on the execution results returned by the hardware accelerator, so that the execution plan tree of the database matches the execution function and capability of the hardware accelerator that performs the acceleration and maintains a reasonable complexity.

9 Claims, 7 Drawing Sheets

(51) Int. Cl.
    *G06F 16/23*     (2019.01)
    *G06F 16/2453*     (2019.01)

(56) References Cited

U.S. PATENT DOCUMENTS

| | | | |
|---|---|---|---|
| 2012/0117027 A1 | 5/2012 | Shau et al. | |
| 2014/0032509 A1 | 1/2014 | Sukhwani et al. | |
| 2015/0046428 A1* | 2/2015 | Asaad | G06F 16/24542 707/718 |
| 2015/0046430 A1* | 2/2015 | Asaad | G06F 16/2455 707/718 |
| 2015/0234895 A1 | 8/2015 | Erdogan et al. | |
| 2017/0255673 A1* | 9/2017 | Li | G06F 16/24542 |
| 2019/0324964 A1* | 10/2019 | Shiran | G06F 16/2228 |
| 2019/0332422 A1* | 10/2019 | Liu | G06F 9/4881 |
| 2019/0392002 A1 | 12/2019 | Lavasani et al. | |
| 2020/0301898 A1* | 9/2020 | Samynathan | G06F 16/2453 |
| 2021/0357406 A1* | 11/2021 | Potharaju | G06F 16/2471 |

FOREIGN PATENT DOCUMENTS

| | | | |
|---|---|---|---|
| CN | 106991116 A | | 7/2017 |
| CN | 107545015 A | | 1/2018 |
| CN | 107690622 A | | 2/2018 |
| CN | 108038215 A | | 5/2018 |
| CN | 110569257 A | | 12/2019 |
| CN | 110688393 A | | 1/2020 |
| CN | 111026776 A | * | 4/2020 |
| CN | 111026776 A | | 4/2020 |
| CN | 111625585 A | | 9/2020 |
| CN | 113448967 A | | 9/2021 |

OTHER PUBLICATIONS

Shin-chi Lai, etc. An efficient DCT-IV-based ECG compression algorithm and its hardware accelerator design. IEEE 2013.
International Search Report issued Apr. 20, 2022 for PCT/CN2021/131504.

* cited by examiner

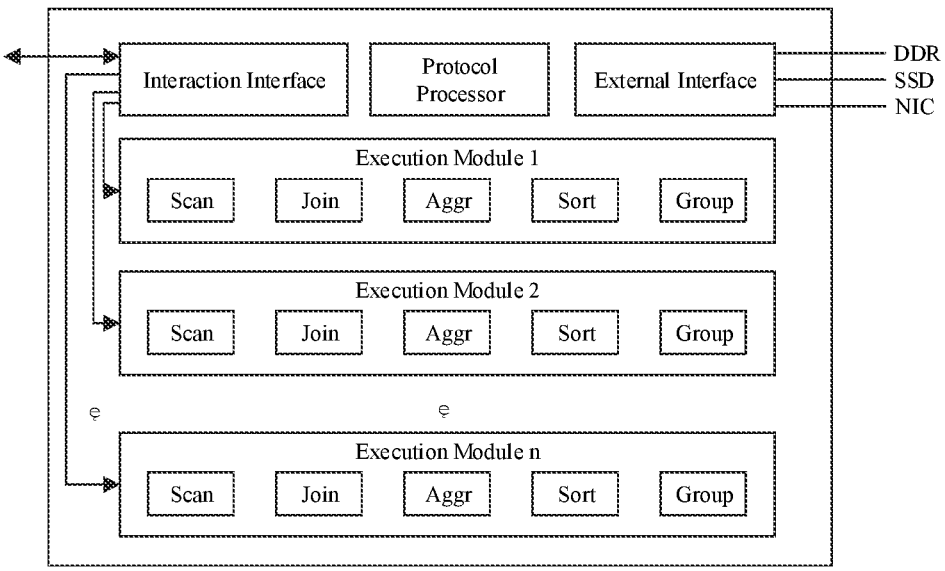

FIG. 10

QUERY PLAN
--------------------------------------------------------------------------------------------------------------------------------
Finalize GroupAggregate (cost=100533.58..101385.70 rows=6145 width=98)
  Group Key: n1.n_name, n2.n_name, (date_part('year':: text, (lineitem.l_shipdate): :timestamp without time zone))
  -> Gather Merge(cost=100533.58..101214.16 rows=5120 width=98)
     Workers planned: 2
     -> Partial GroupAggregate(cost=99533.56..99623.16 rows=2560 width=98)
        Group Key: n1.n_name, n2n_name, (date_part('year':: text, (lineitem. l_shipdate): :timestamp without time zone))
        -> Sort(cost=99533.56..99539.96 rows=2560 width=78)
           Sort Key: n1.n_name, n2.n_name, (date_ part('year':: text, (lineitem. l_shipdate): :timestamp without time zone))
           -> Hash Join (cost=4830.31..99388.64 rows=2560 width=78)
              Hash Cond: (lineitem.l_ suppkey = supplier.s_suppkey)
              Join Filter: (((n1.n_name= 'GERMANY':: bpchar) AND(n2n_name= 'EGYPT' ::bpchar) )OR(n1.n_name = 'E G Y P T' :: bpchar) AND(n2 . n_name = 'GERMANY'::bpchar)))
              -> Nested Loop(cost=4466.21..98682.52 rows=61541 width=49)
                 -> Parallel Hash Join (cost=4465.77..39362.86 rows=50000 width=33)
                    Hash Cond: (orders.o_custkey = customer.c_custkey)
                    -> Parallel Seq Scan on orders (cost=0.00..32345.00 rows=625000 width=8)
                    -> Parallel Hash (cost=4403. 27. .4403. 27 rows=5000 width=33)
                       -> Hash Join (cost=1. 40.. 4403.27 rows=5000 width=3)
                          Hash Cond: (customer.c_nationkey = n2.n_nationkey)
                          -> Parallel Seg Scan on customer (cost=0.00..4210.00 rows=62500 width=8)
                          -> Hash (cost=1.38..1.38 rows=2 width=33)
                             -> Seg Scan on nation n2 (cost=0.00..1.38 rows=2 width=33) ◄─────────
                                Filter: ((n_name= 'EGYPT'::bpchar) OR (n_Name = 'GERMANY'::bpchar)) ◄─────────
                 -> Index Scan using lineitem_pkey on lineitem (cost=0.43..1.14 rows=5 width=24)
                    Index Cond: (L_orderkey = orders.o_Orderkey)
                    Filter:(( l_shipdate >= '1995-01-01'::date) AND (l_Shipdate <= '1996-12-31'::date))
              -> Hash(cost=354.10..354.10 rows=800 wdth=33)
                 -> Hash Join(cost=1.40..354.10 rows=800 width=33)
                    Hash Cond: (supplier.s_nationkey =n1.n_nationkey)
                    -> Seq Scan on supplier (cost=0.00..322.00 rows=10000 width=8)
                    -> Hash (cost=1.38..1.38 rows=2 width=33)
                       -> Seq Scan on nation n1 (cost=0.00..1.38 rows=2 width=33) ◄─────────
                          Filter: ((n_name = 'GERMANY '::bpchar) OR (n_name = 'EGYPT':: bpchar)) ◄─────────
(32 rows)

FIG. 11

-> Index Scan using lineitem_pkey on public.lineitem (cost = 0.43..1.14 rows=5 width=24)
    Output: lineitem.l_orderkey, lineitem.l_partkey, lineitem.l_suppkey, lineitem.l_linenumber, lineitem.l_quantity, lineitem.l_extendedprice,
        lineitem.l_discount, lineitem.l_tax, lineitem.l_returnflag, lineitem.l_linestatus, lineitem.l_shipdate, lineitem.l_commitdate,
        lineitem.l_receiptdate, lineitem.l_shipinstruct, lineitem.l_shipmode, lineitem.l_comment
    Index Cond: (lineitem.l_orderkey = orders.o_orderkey)
    Filter: ((lineitem.l_shipdate >= '1995-01-01'::date) AND (lineitem.l_shipdate <= '1996-12-31'::date))

FIG. 14

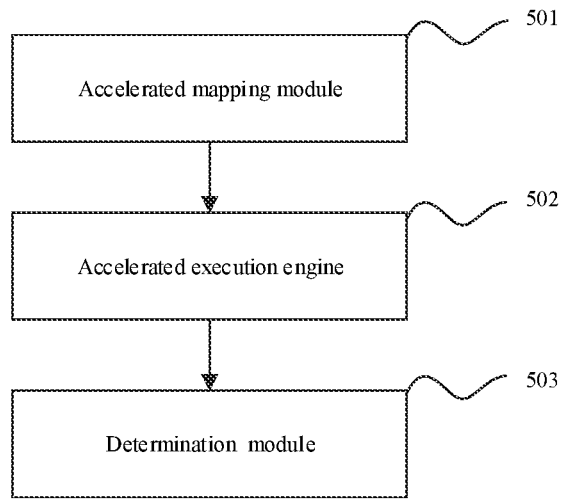

FIG. 15

METHOD AND DEVICE FOR ACCELERATING DATABASE OPERATION

CROSS-REFERENCE TO RELATED APPLICATIONS

This application claims priority to PCT Application No. PCT/CN2021/131504, having a filing date of Nov. 18, 2021, which claims priority to CN Application No. 202110818910.0, having a filing date of Jul. 20, 2021, the entire contents of both of which are hereby incorporated by reference.

FIELD OF TECHNOLOGY

The following relates to the field of database technology, and more specifically, to a method and device for accelerating database operation.

BACKGROUND

The rapid development of mobile Internet and the digital renovation and transformation of various industries in the past decade, there has been massive data growth in various fields, but the development of general-purpose computing power is facing challenges, the improvement of semiconductor technology has almost reached the physical limit, general-purpose processor performance can no longer grow in accordance with Moore's Law. With the advent of 5G, Cloud Computing, Internet of Everything, Artificial Intelligence era, the requirements for data generation, transmission, storage, and analytical processing are increasing, and the gap between the data growth requirements for computational performance and processor performance development is growing.

In existing technologies, heterogeneous computing solutions are often used to meet performance requirements in database application areas facing performance challenges of massive data processing and analysis. The usual hardware acceleration solution is to extend a PCIe (Peripheral Component Interconnect Express) interface accelerator card on the server where the database software is deployed, and achieve the database processing performance improvement by offloading some database operations to the acceleration card for execution.

How to use hardware to improve database processing performance as much as possible has become an important technical research point in the database field.

Usually, database execution is shown in FIG. 1, where the user inputs a query request, which is analyzed by a parsing engine to generate a parse tree, processed by the optimization engine to output the query tree and rewrite it as an execution plan tree, and then actually executed by the execution engine according to the execution plan tree, and the final data is read, cached or stored by the storage engine.

Hardware acceleration is usually output by the database optimization engine, which offloads some execution nodes in the execution plan tree executed by the execution engine to the hardware for execution. However, hardware is limited by resource, power consumption, and complexity, and does not enable the same number of complex execution functions as software, and usually only enables some basic relational algebraic operations such as selection, projection, concatenation, etc. In addition, in some scenarios, such as the existence of subqueries, the optimization engine outputs a plan tree with similar functions in different nodes, which is a waste of hardware capacity. This all leads to the fact that the execution actions in the current software-generated execution plan tree do not match the execution functions and capabilities of the hardware well.

Therefore, how to realize the execution plan tree of the database to match the execution function and capability of the hardware accelerator that performs acceleration and maintain a reasonable complexity, and then fully utilize the acceleration capability of this hardware accelerator, is the current technical problem that needs to be solved.

SUMMARY

An aspect relates to a method for accelerating database operation to solve the technical problem that the execution plan tree generated in a prior art does not well match the execution functions and capabilities of a hardware accelerator, the method being applied to a database connected with a hardware gas accelerator, the method comprises:

when receiving an initial execution plan tree sent by the database that needs to be accelerated, processing the initial execution plan tree and generating a new execution plan tree based on the basic operation and accelerated resource supported by the hardware accelerator;

if the new execution cost of the new execution plan tree is less than the initial execution cost of the initial execution plan tree, distributing the new execution plan tree to the hardware accelerator for execution based on the organization approach and the operation approach of the hardware accelerator;

determining the result data after the hardware accelerator has accelerated the database operations based on the execution result returned by the hardware accelerator;

wherein the new execution cost and the initial execution cost are determined based on calling a preset cost function.

In some embodiments of the present application, processing the initial execution plan tree and generating a new execution plan tree based on the basic operation and accelerated resource supported by the hardware accelerator, specifically:

normalizing and mapping nodes in the initial execution plan tree that perform accelerated operation according to the basic operation, generating a matching execution plan tree that matches the hardware accelerator according to the results of the normalization mapping;

in addition, the accelerated mapping module will map the nodes corresponding to the accelerated execution action with normalization, while also removing some of the nodes whose functions have been integrated, and then some of the nodes will be pre-processed and then mapped.

Optimizing nodes and output target columns in the matching execution plan tree based on the accelerated resource and generating the new execution plan tree based on the optimization results.

In some embodiments of the present application, the normalization mapping comprises subsuming, and/or deleting, and/or adding.

In some embodiments of the present application, optimizing nodes and output target columns in the matching execution plan tree based on the accelerated resource, specifically:

determining, based on the accelerated resource, the manner in which the hardware accelerator accesses the required data, the manner in which each node performs data access, the columns to be used for the final output and the successor nodes;

determining the nodes in the matching execution plan tree that can be executed concurrently based on the manner in which the hardware accelerator accesses the required data, and combining different execution nodes in the matching execution plan tree that perform access to the same data into a single execution action, and optimizing the output target column based on the columns to be used for the final output and successor nodes;

wherein the manner in which the hardware accelerator accesses the required data including access based on its own memory, or access to shared memory based on a cache coherency protocol, or access to remote storage nodes via the network.

In some embodiments of the present application, distributing the new execution plan tree to the hardware accelerator for execution based on the organization approach and the operation approach of the hardware accelerator, specifically:

according to a digital twin image corresponding to the organization approach and the operation approach, sending one or more of the new execution plan trees as a whole to the hardware accelerator for execution, or sending the new execution plan trees sequentially to the hardware accelerator by individual nodes for execution, or sending a combination of plurality of nodes in the new execution plan trees to the hardware accelerator for execution;

wherein the digital twin image includes a number of execution modules of the hardware accelerator, a number of executable function nodes, an attribution relationship of each executable function node and a schedulable execution granularity.

In some embodiments of the present application, the method further comprises:

generating the digital twin image based on the self information when initialization instructions are received and when self information including organization approach and operation approach is received from the hardware accelerator.

In some embodiments of the present application, the hardware accelerator is a plurality of hardware accelerators, each the hardware accelerator being provided with a local storage unit, and that before determining the result data of the hardware accelerator after accelerating database operation based on the execution results returned by the hardware accelerator, the method further comprises:

adjusting the cache and final data of each the hardware accelerator corresponding to the execution results, so that each the cache and each the final data are consistent, respectively.

In some embodiments of the present application, after processing the initial execution plan tree and generating a new execution plan tree and a new execution cost based on the basic operation and accelerated resource supported by the hardware accelerator, the method further comprises:

if the new execution cost is not less than the initial execution cost, executing the initial execution plan tree based on the database, and determining the result of the database operation based on the execution result.

Accordingly, embodiments of the present invention also provide a hardware acceleration device for accelerating database operation, applied to a database connected with a hardware accelerator, the device comprises:

an accelerated mapping module, for receiving an initial execution plan tree sent by the database that needs to be accelerated, processing the initial execution plan tree and generating a new execution plan tree based on the basic operation and accelerated resource supported by the hardware accelerator;

an accelerated execution engine module, for if the new execution cost of the new execution plan tree is less than the initial execution cost of the initial execution plan tree, distributing the new execution plan tree to the hardware accelerator for execution based on the organization approach and the operation approach of the hardware accelerator;

an accelerated storage engine module, for completing memory and external memory management of the accelerated portion, and coordinating cache and final data consistency among a plurality of the hardware accelerator;

a determination module, for determining the result data after the hardware accelerator has accelerated the database operations based on the execution result returned by the hardware accelerator;

wherein the new execution cost and the initial execution cost are determined based on calling a preset cost function.

Accordingly, embodiments of the present invention also provide a computer-readable storage medium, the computer-readable storage medium has instructions stored in it, when the instructions are run on the terminal device, causing the terminal device to execute a method for accelerating database operation as mentioned above.

By applying above technical solution, in the database connected to the hardware accelerator, when the initial execution plan tree is received from the database that needs to be accelerated, the initial execution plan tree is processed and the new execution plan tree is generated according to the basic operations and the accelerated resources supported by the hardware accelerator; if the new execution cost of the new execution plan tree is less than the initial execution cost of the initial execution plan tree, the new execution plan tree is distributed to the hardware accelerator for execution according to the organization approach and the operation approach of the hardware accelerator; the result data of the hardware accelerator for accelerating database operations is determined according to the execution junction returned by the hardware accelerator, so that the execution plan tree of the database matches the execution function and capability of the hardware accelerator and maintains a reasonable complexity, in turn, the hardware accelerator's acceleration capability is fully utilized, and the hardware acceleration is achieved while preserving existing database system architecture, ensuring the reliability of database system.

BRIEF DESCRIPTION

Some of the embodiments will be described in detail, with references to the following Figures, wherein like designations denote like members, wherein:

FIG. 10 illustrates a schematic diagram of the structure of a hardware accelerator in an embodiment of the present invention;

FIG. 11 illustrates a schematic diagram of the execution plan of the PostgreSQL output in an embodiment of the present invention;

FIG. 14 illustrates a schematic diagram of the output column optimization code in an embodiment of the present invention; and FIG. 15 illustrates a schematic diagram of the structure of a hardware acceleration device for accelerating database operation proposed by an embodiment of the present invention.

DETAILED DESCRIPTION

The technical solutions in the embodiments of the present application will be clearly and completely described below in conjunction with the accompanying drawings in the embodiments of the present application, and it is clear that the embodiments described are only a part of the embodiments of the present application, and not all of them. Based on the embodiments in the present application, all other embodiments obtained by a person of ordinary skill in the art without creative labor fall within the scope of protection of the present application.

Figure 1:
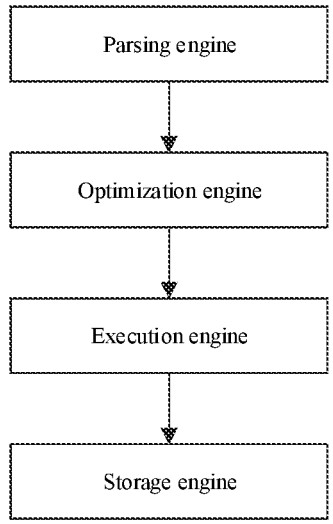
FIG. 1 illustrates a schematic view of the database architecture in the prior art.
Figure 2:
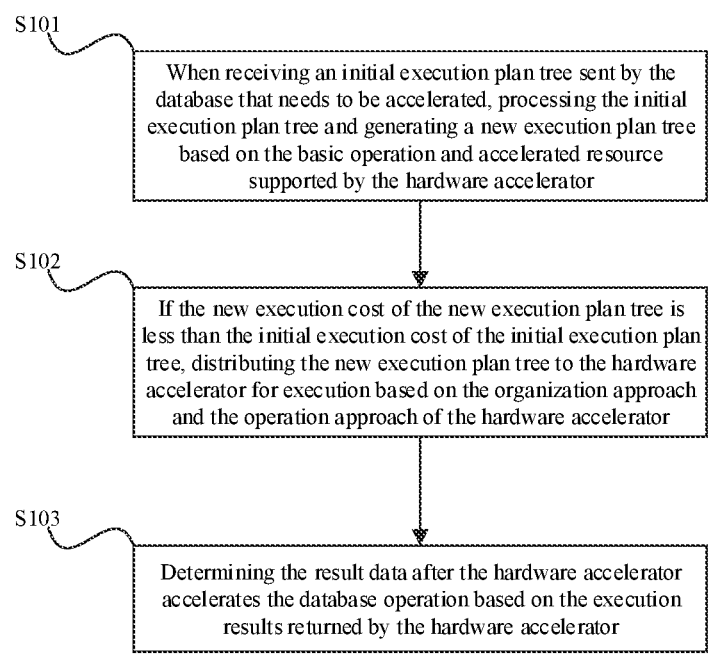
FIG. 2 illustrates a schematic flow diagram of a method for accelerating database operation as proposed by embodiments of the present invention.

The present medium invitation embodiment provides a method for accelerating database operation, applied to a database connected with a hardware accelerator, as shown in FIG. 2, the method comprising the steps of:

step S101, when receiving an initial execution plan tree sent by the database that needs to be accelerated, processing the initial execution plan tree and generating a new execution plan tree based on the basic operation and accelerated resource supported by the hardware accelerator.

In this embodiment, the database is connected to the. hardware accelerator, which may be an external hardware accelerator, a device that implements acceleration based on hardware, including a GPU (Graphics Processing Unit), or an FPGA (Field Programmable Gate Array), or ASIC (Application Specific Integrated Circuit). The database operations are a series of operations performed on the data on the database, including reading data, writing data, updating or modifying data, deleting data, etc.

The initial execution plan tree is generated by the optimization engine in the database after query rewriting of a parse tree sent by a parsing engine, and a parse tree is generated by a parsing engine according to a query request input by the user, that is, when receiving a query request input by user, a query request can be a query request including acceleration instructions, and if a query request requires acceleration, a parsing engine generates a parse tree according to a query request and sends a parse tree to the optimization engine, optimization engine rewrites the query for a parse tree and generates the initial execution plan tree that needs to be accelerated, upon receiving this initial execution plan tree, since hardware accelerator generally support only a limited number of basic operations and different hardware accelerator have different accelerated resources, the initial execution plan tree is processed and a new execution plan tree is generated according to the basic operations and accelerated resources supported by the hardware accelerator.

In order to reliably generate a new execution plan tree, in some embodiments of the present application, processing the initial execution plan tree and generating a new execution plan tree based on the basic operation and accelerated resource supported by the hardware accelerator, specifically:

normalizing and mapping nodes in the initial execution plan tree that perform accelerated operation according to the basic operation, generating a matching execution plan tree that matches the hardware accelerator according to the results of the normalization mapping;

in addition, the accelerated mapping module will map the nodes corresponding to the accelerated execution action with normalization, while also removing some of the nodes whose functions have been integrated, and then some of the nodes will be pre-processed and then mapped.

Optimizing nodes and output target columns in the matching execution plan tree based on the accelerated resource and generating the new execution plan tree based on the optimization results.

In this embodiment, in order to match a functionality of the new execution plan tree with the hardware accelerator, normalizing and mapping nodes in the initial execution plan tree that perform accelerated operation according to the basic operation, this normalized mapping means that the nodes in the initial execution plan tree that perform accelerated operations are formed to correspond to each basic operation. Generating a matching execution plan tree that matches the hardware accelerator according to the results of the normalization mapping, due to the difference in accelerated resources of different hardware accelerator, the nodes and output target columns in the matching execution plan tree are optimized according to the accelerated resources of hardware accelerator in order to better match the capabilities of hardware accelerator, and a new execution plan tree is generated based on the optimization results.

It should be noted that the solution of above embodiment is only a specific embodiment proposed in this application, other ways of processing the initial execution plan tree and generating a new execution plan tree based on the basic operations and accelerated resources supported by the hardware accelerator are within a scope of protection of this application.

In order to generate an accurate matching plan tree, in some embodiments of the present application, the normalization mapping comprises subsuming, and/or deleting, and/ or adding.

In order to accurately optimize the nodes and output target columns in the matching execution plan tree, in some embodiments of the present application, optimizing nodes and output target columns in the matching execution plan tree based on the accelerated resource, specifically:

determining, based on the accelerated resource, the manner in which the hardware accelerator accesses the required data, the manner in which each node performs data access, the columns to be used for the final output and the successor nodes;

determining the nodes in the matching execution plan tree that can be executed concurrently based on the manner in which the hardware accelerator accesses the required data, and combining different execution nodes in the matching execution plan tree that perform access to the same data into a single execution action, and optimizing the output target column based on the columns to be used for the final output and successor nodes;

wherein the manner in which the hardware accelerator accesses the required data including access based on its own memory, or access to shared memory based on a cache coherency protocol, or access to remote storage nodes via the network.

In this embodiment, the hardware accelerator can access the required data in different ways, including access based on its own memory, or access to shared memory based on cache coherency protocol, or access to remote storage nodes via the network, and the nodes in the matching execution plan tree that can be executed concurrently are determined based on the way the hardware accelerator accesses the required data; when there are different nodes accessing the same data in the matching execution plan tree, the different execution nodes accessing the same data in the matching execution plan tree are combined into one execution action to avoid wasting resources; since the output columns to be used by the final output and the successor nodes are not all columns, the output marker columns are optimized according to the columns to be used by the final output and the successor nodes.

It should be noted that the scheme of above embodiments is only a specific embodiment proposed in this application, and other ways of optimizing nodes and output target columns in the matching execution plan tree according to the accelerated resources are within the scope of protection of this application.

Step S102, if the new execution cost of the new execution plan tree is less than the initial execution cost of the initial execution plan tree, distributing the new execution plan tree to the hardware accelerator for execution based on the organization approach and the operation approach of the hardware accelerator.

In this embodiment, the new execution cost is the computational resources consumed to execute the new execution plan tree, and the initial execution cost is the computational resources consumed to execute the initial execution plan tree, and the new execution cost and the initial execution cost can be determined separately by calling the preset cost function, and if the new execution cost is less than the initial execution cost, it means that the new execution plan tree is better than the initial execution plan tree, based on the fact that different hardware accelerators have different organization approach and operation approach, distribute the new execution plan tree to the hardware accelerator for execution according to the organization approach and the operation approach.

In order to accurately distribute the new execution plan tree to the hardware accelerator for execution, in some embodiments of the present application, distributing the new execution plan tree to the hardware accelerator for execution based on the organization approach and the operation approach of the hardware accelerator, specifically:

according to a digital twin image corresponding to the organization approach and the operation approach, sending one or more of the new execution plan trees as a whole to the hardware accelerator for execution, or sending the new execution plan trees sequentially to the hardware accelerator by individual nodes for execution, or sending a combination of plurality of nodes in the new execution plan trees to the hardware accelerator for execution;

wherein the digital twin image includes a number of execution modules of the hardware accelerator, a number of executable function nodes, an attribution relationship of each executable function node and a schedulable execution granularity.

In this embodiment, the hardware accelerator may include one or more execution modules, and the digital twin image includes the number of execution modules of the hardware accelerator, the number of executable functional nodes, the attribution of each executable functional node, and the schedulable execution granularity.

One or more new execution plan trees are sent to the hardware accelerator for execution as a whole, or new execution plan trees are sent to the hardware accelerator for execution sequentially by individual nodes, or plurality of nodes in a new execution plan tree are sent to the hardware accelerator for execution based on the digital twin image, for example, if the hardware accelerator is implemented using an FPGA that implements plurality of independent relational algebraic operation pipelines, then plurality of new execution plan trees can be sent to the hardware accelerator at one time; if the hardware accelerator implements a time-sharing function and scheduling capability for each basic relational algebra operator, plurality of execution nodes in the new execution plan tree can be sent to the hardware accelerator for execution based on the resources of the basic operators.

Other ways of distributing the new execution plan tree to the hardware accelerator for execution based on the organization and operation of the hardware accelerator are within the scope of protection of this application.

In order to accurately distribute the new execution plan tree to the hardware accelerator for execution, in some embodiments of the present application, the method further comprises:

generating the digital twin image based on the self information when initialization instructions are received and when self information including organization approach and operation approach is received from the hardware accelerator.

In this embodiment, during initialization, the hardware accelerator submits its own information including the organization approach and the operation approach, digital twin images can be generated based on this own information.

In order to ensure the reliability of the database operation, in some embodiments of the present application, after processing the initial execution plan tree and generating a new execution plan tree and a new execution cost based on the basic operation and accelerated resource supported by the hardware accelerator, the method further comprises:

if the new execution cost is not less than the initial execution cost, executing the initial execution plan tree based on the database, and determining the result of the database operation based on the execution result.

In this embodiment, if the new execution cost is not less than the initial execution cost, it means that less computational resources are required to execute the initial execution plan tree, at which point the initial execution plan tree is executed based on the database and the results of the database operations are determined based on the execution results.

Step S103, determining the result data after the hardware accelerator has accelerated the database operations based on the execution result returned by the hardware accelerator.

In this embodiment, the hardware accelerator executes the new execution plan tree and returns an execution result, thereby determining the result data after the hardware accelerator accelerates the database operation.

It will be appreciated that, after performing step S103, the method further comprises:
if the database exists while executing a part of the new execution plan tree, determining the operation result of the database based on the result data and the execution result of the database itself, otherwise, determining the result data as the operation result.

In order to accurately determine the result data after the hardware accelerator has accelerated the database operation, in some embodiments of the present application, the hardware accelerator is a plurality of hardware accelerators, each the hardware accelerator being provided with a local storage unit, and that before determining the result data of the hardware accelerator after accelerating database operation based on the execution results returned by the hardware accelerator, the method further comprises:
adjusting the cache and final data of each the hardware accelerator corresponding to the execution results, so that each the cache and each the final data are consistent, respectively.

In this embodiment, when the hardware accelerator executes a new execution plan tree, memory and external memory need to be managed, and if the hardware accelerator is a plurality of hardware accelerators, each hardware accelerator is set with a local storage unit, and the cache and final data of each hardware accelerator corresponding to the execution result need to be adjusted so that each cache and each final data are consistent, respectively.

By applying above technical solution, in the database connected to the hardware accelerator, when the initial execution plan tree is received from the database that needs to be accelerated, the initial execution plan tree is processed and the new execution plan tree is generated according to the basic operations and the accelerated resources supported by the hardware accelerator; if the new execution cost of the new execution plan tree is less than the initial execution cost of the initial execution plan tree, the new execution plan tree is distributed to the hardware accelerator for execution according to the organization approach and the operation approach of the hardware accelerator; the result data of the hardware accelerator for accelerating database operations is determined according to the execution junction returned by the hardware accelerator, so that the execution plan tree of the database matches the execution function and capability of the hardware accelerator and maintains a reasonable complexity, in turn, the hardware accelerator's acceleration capability is fully utilized, and the hardware acceleration is achieved while preserving existing database system architecture, ensuring the reliability of database system.

In order to further elaborate the technical idea of embodiments of the present invention, the technical solution is described in the context of a specific application scenario.

Figure 3:
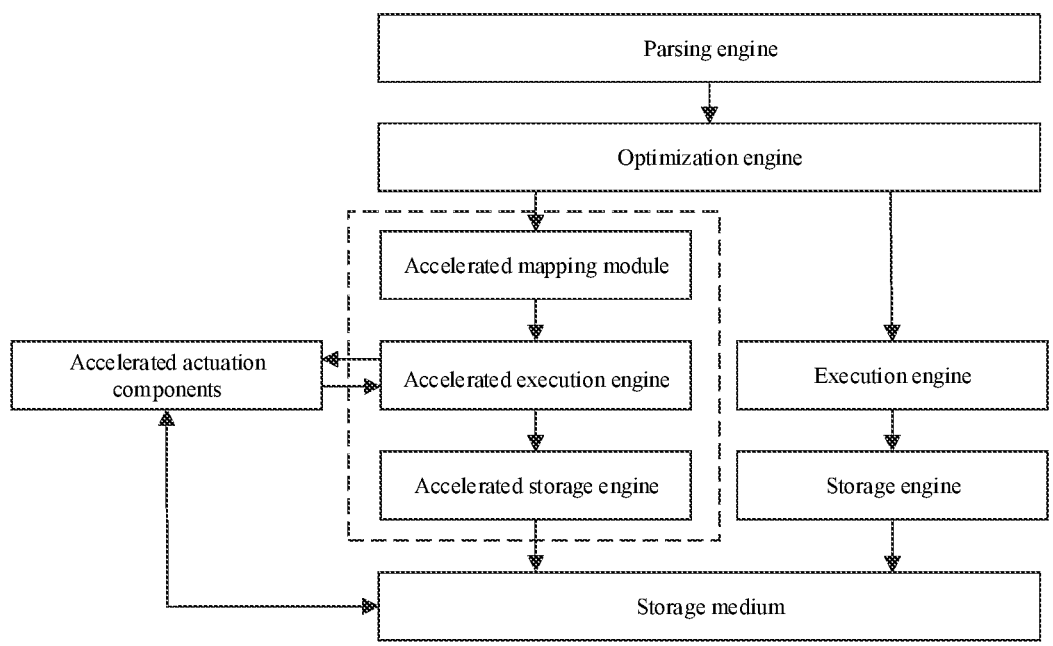
FIG. 3 illustrates a schematic diagram of the database architecture of an embodiment of the present invention.

The application embodiment provides a method for accelerating database operation, as shown in FIG. 3, adding a new accelerated part of the processing flow (the part in the dashed box), coexisting with the existing flow (the part without the dashed box), realizing the execution node remapping and optimization processing of the execution plan tree through the accelerated mapping module to achieve matching with the hardware accelerator function, outputting the new execution plan tree after matching, and then the accelerated execution engine module passes the new execution plan tree to the hardware accelerator for execution.

Among them, the core of the hardware accelerator is the hardware accelerator, which can be GPU, FPGA or ASIC, mainly to achieve accelerable database operations, such as data scanning, conditional filtering, multi-table join, group aggregation, sorting and other functions that can be reasonably achieved by other hardware. In addition, some complex function processing needs an additional co-processor to complete. Or for more high-speed data access and storage, it can also be connected to memory and high-speed disk.

The hardware accelerator organizes the database operations it implements to achieve concurrency between the operation functions. One possible embodiment, considering the complexity of the embodiment, is to implement the simplest of multiple mutually independent execution modules. That is, each module has the same sub-functions, and each of them can complete the execution of a plan tree independently (perhaps with the assistance of a coprocessor). The structure is shown in FIG. 10.

The specific organization of the hardware accelerator is not limited, before its formal embodiment of accelerated processing, it needs to announce its organization approach and operation approach of self-resource function to the accelerated execution engine module, that is, the digital twin image of the hardware accelerator in the accelerated execution engine. In this way, the accelerated execution engine can efficiently use the full capabilities of the hardware accelerator.

The method includes the following steps:
step 1, the accelerated mapping module receives the initial execution plan tree to be accelerated after being parsed by the parsing engine and processed by the optimization engine for output;

step 2, the accelerated mapping module completes the remapping of the nodes in the initial execution plan tree based on the mapping rules of the execution node types to obtain a matching execution plan tree matching the acceleration function nodes; then it performs node merging and output target column optimization on the matching execution plan tree to output a new execution plan tree;

the accelerated mapping module compares the new execution cost of the new execution plan tree with the initial execution cost of the initial execution plan tree, and if the initial execution cost is smaller, resends the initial execution plan tree to the execution engine for execution, otherwise executes step 3;

step 3, the accelerated execution engine module selects whether to send multiple or single entire new execution plan trees at once, or a combination of multiple or single execution nodes in the new execution plan tree to the hardware accelerator, depending on the resources and capabilities of the hardware accelerator.

step 4, the hardware accelerator completes the correspondence function for the received nodes and returns the final result dataset;

step 5, the accelerated storage engine completes the memory and external memory management for the accelerated part.

The modules in the acceleration part of the processing flow can be scattered in multiple hardware boards implemented by different devices, or integrated in one hardware board implemented by one physical device, and their interfaces are traditional PCIe, Eth, FC (Fibre Channel), Infiniband, etc., or CCIX (Cache Coherent Interconnect for Accelerators), CXL (Compute Express Link), or other internal high-speed data interfaces, as the skilled person in the art may determine.

The following is a description of each module involved in the acceleration part of the processing flow in FIG. 3.

1. Accelerated Mapping Module

The execution plan tree generated by the existing optimization engine after query rewriting has very many node types. The execution plan tree output by the current open source database software PostgreSQL after query rewriting has 40 possible node types, which are divided into four major categories of control node, scan node, connection node, and materialized node, while the hardware acceleration is not able to achieve so many complex execution functions considering the resource cost, power limitation, and embodiment complexity, the basic operations are reported by the hardware accelerators or determined mutually in advance.

Taking the current PostgreSQL scan node as an example, it implements a total of 16 scan node types, as the use of FPGA to implement the acceleration components, the support for scan actions usually implements one, such as sequential scan, and depending on the index embodiment, index scan may also be provided. Therefore, the accelerated mapping module needs to map the received plan tree with possibly as many as 16 different types of scan nodes into a hardware-supported scan action.

Figure 4:
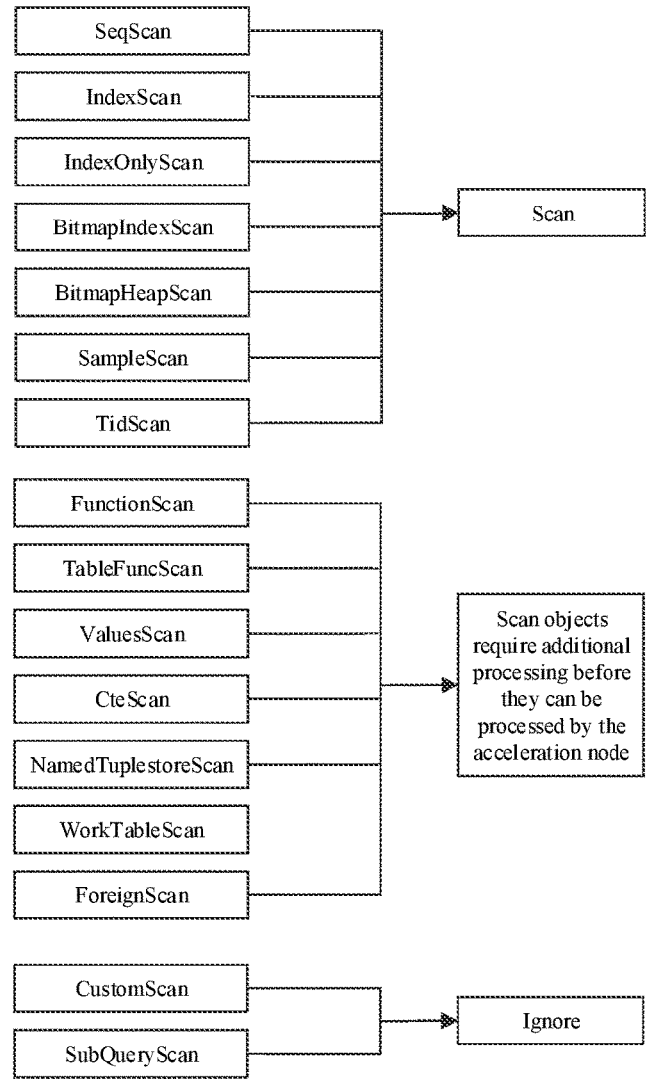
FIG. 4 illustrates a schematic diagram of the scanning node mapping principle in embodiments of the present invention.

As shown in FIG. 4, the first seven scan nodes can be mapped directly to hardware accelerators, and the last two will not appear in the execution tree and can be ignored. The remaining types of scan nodes all require additional processing with software. FunctionScan, TableFuncScan depending on whether the hardware supports the corresponding functional function mapped to the corresponding function call, or mapped to a software call to return all the results at once; CteScan scan is CTE (Common Table Expressions) generated by the temporary table, usually can be left alone, only the generated temporary tables can be passed to the upper nodes, but when the control node RecursiveUnion appears, it is necessary to work with WorkTableScan to remap together after the Recursive expansion. NamedTuplestoreScan will pass the scanned temporary tables to the upper layer; ValuesScan, ForeignScan also return all the results at once.

Figure 5:
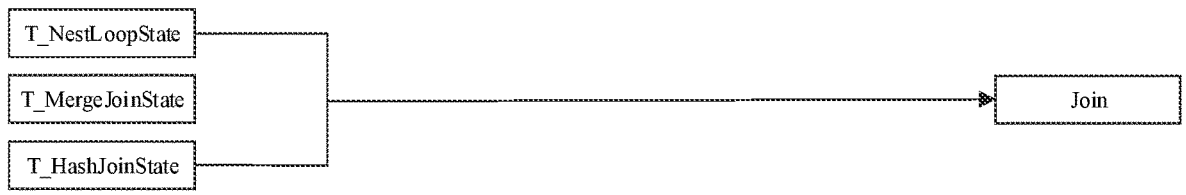
FIG. 5 illustrates a schematic diagram of the connection node mapping principle in an embodiment of the present invention.

As shown in FIG. 5, there are three types of join nodes PostgreSQL, NestLoop, MergeJoin and HashJoin, corresponding to the hardware accelerator, there is only one join action. The accelerated mapping module maps and normalizes the different types of join nodes received in the plan tree into the hardware-supported join actions. As shown in FIG. 5, where the Hash nodes in the lower level of HashJoin can be directly ignored and removed in this mapping.

Figure 6:
FIG. 6 illustrates a schematic diagram I of the materialized node mapping principle in an embodiment of the present invention.
Figure 7:
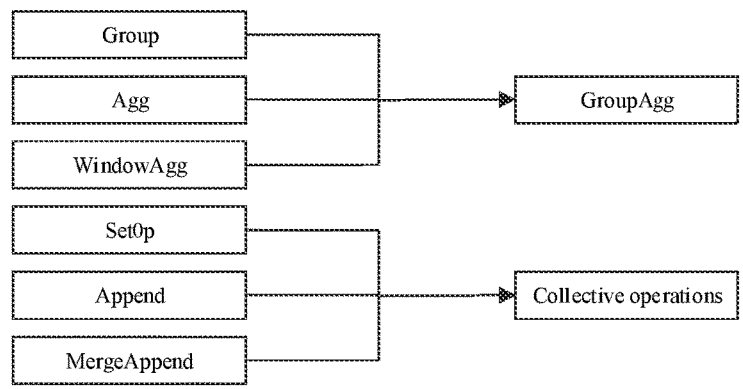
FIG. 7 illustrates a schematic diagram II of the materialized node mapping principle in embodiments of the present invention.

As shown in FIG. 6, the Sort and IncrementalSort in the materialization node are mapped to the Sort of the hardware accelerator; as shown in FIG. 7, the Group node, Agg node, and WindowAgg node are mapped to the GroupAge of the hardware accelerator; SetOp plus the Append node in the control node, MergeAppend node has been mapped to the hardware accelerator's collection operation. The Limit and Unique nodes in the materialization node are mapped to a parameter of the hardware accelerator and no longer correspond to a specific action.

Figure 8:
FIG. 8 illustrates a schematic diagram of the control node mapping principle in embodiments of the present invention.

As shown in FIG. 8, in addition to the Append and MergeAppend nodes in the control node, Gather and GatherMerge are ignored, and the rest of bitmapAnd and bitmapOr are merged into the hardware accelerator's Scan along with bitmapindexScan. The RecursiveUnion is expanded and then mapped together with CteScan and WorkTableScan, ModifyTable corresponds to the hardware accelerator's add, delete and change operations, and the remaining control nodes also return all results at once.

In summary, the accelerated mapping module maps the nodes corresponding to the accelerated execution actions in a normalized manner, while removing some of the nodes whose functions are integrated, where some of the nodes are pre-processed and then mapped.

After the accelerated mapping module completes the mapping process, it then performs the optimal matching of nodes and output columns of the execution tree according to the accelerated resources of the hardware accelerator.

For example, one possible way for the hardware accelerator is to hold a large amount of memory itself, or to access the shared memory directly through cache coherency protocols (e.g., CCIX, CXL), etc., or it can access the data of remote storage nodes by network access, so that it can decide concurrent scan node actions that can be performed based on the storage of the data to be accessed.

At the same time, accesses to the same data by different execution nodes can be directly combined into one execution action. Also the intermediate output generated by the accelerated part execution can eliminate the cache of output columns that are not related to the subsequent processing nodes and the final result.

2, Accelerated Execution Engine

The accelerated execution engine can perform some of the node functions itself, in the case of postgres, such as Result nodes, RecursiveUnion nodes, etc., the accelerated execution engine also chooses how to distribute the new execution plan tree received after matching to one or more hardware accelerators for execution, depending on how the hardware accelerator is implemented.

At initialization, all hardware accelerators inform the accelerated execution engine of their own information, including organization approach and operation approach, and the accelerated execution engine itself maintains a digital twin image of the hardware accelerators. Based on this self-information, a choice is made on how to submit the new execution plan tree to the hardware accelerators. The digital twin image includes information about the number of execution modules of the hardware accelerator, the number of executable function nodes, their respective affiliations, the granularity of execution that can be scheduled, etc. If the hardware accelerator uses the architecture shown in FIG. 10, this digital twin image includes the execution granularity up to the entire execution tree, the minimum determined by the scheduling method of its internal nodes, the functional nodes included in each execution module, their respective numbers, the scheduling method of the internal nodes of the execution tree, etc.

Figure 9:
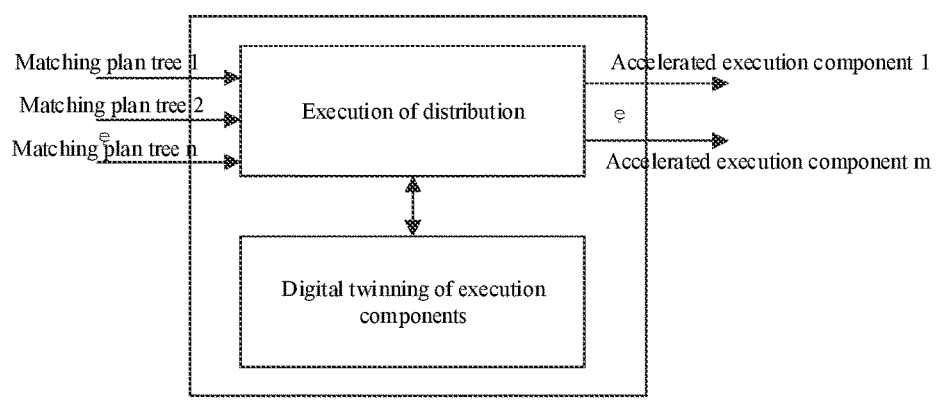
FIG. 9 illustrates a schematic diagram of the accelerated execution engine principle in embodiments of the present invention.

One possible embodiment is to send the new execution plan tree corresponding to the query requests of multiple user terminals to the hardware accelerator. The hardware accelerator corresponds them one by one to one of its execution modules and executes them in turn by individual nodes, to complete the accelerated processing. This is limited to the hardware accelerator's adoption of the architecture shown in FIG. 10. If the rest of the architectures, the execution actions will also be different. A schematic diagram of the accelerated execution engine is shown in FIG. 9, where the matching plan trees 1-n are the new execution plan trees 1-n, and the execution part digital twins are the digital twin images.

3. Accelerated Storage Engine

The accelerated storage engine completes the memory and external memory management of the accelerated part, if multiple hardware accelerators have their own local storage units, it is also necessary to coordinate the cache and final data consistency among multiple hardware accelerators.

The following is an illustration of this scheme using Q7 tested by TPC-H as an example.

The corresponding SQL (Structured Query Language) is as follows:

```
select sup_nation, cust_nation, l_year, sum(volume) as revenue
from (
  select
    n1.n_name as sup_nation,
    n2.n_name as cust_nation,
    extract(year from l_shipdate) as l_year,
    l_extendedprice* (1-l_discount) as volume
  from
    supplier,
    lineitem,
    orders,
    customer,
    nation n1,
    nation n2
  where
    s_suppkey = l_suppkey
    and o_orderkey = l_orderkey
    and c_custkey = o_custkey
    and s_nationkey = n1.n_nationkey
    and c_nationkey = n2.n_nationkey
    and (
      (n1.n_name = 'GERMANY' and n2.n_name = 'EGYPT')
      or(n1.n_name = 'EGYPT' and n2.n_name = 'GERMANY')
    )
    and l_shipdate between date '1995-01-01' and date '1996-12-31'
)as shipping
group by
  supp_nation,
  cust_nation,
  l_year
order by
  supp_nation,
  cust nation,
  l_year
```

The execution plan output by PostgreSQL is shown in the figure. The two scan nodes indicated by arrows in the figure can be node merged for the same table with the same conditions of scanning.

Figure 12:
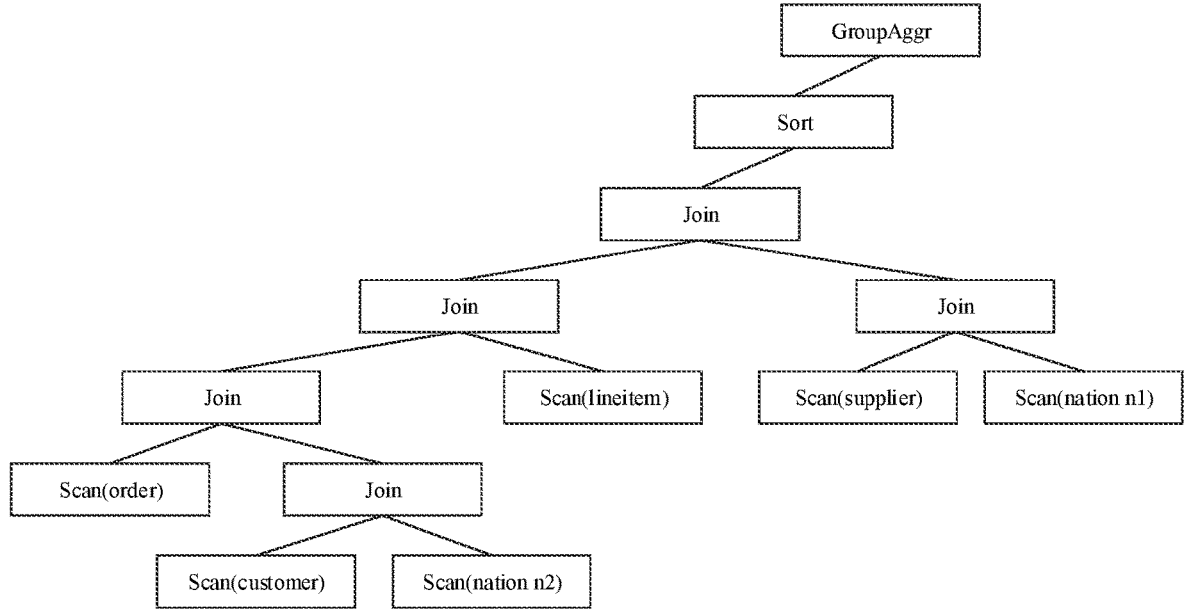
FIG. 12 illustrates a schematic diagram of the mapped execution plan tree in embodiments of the present invention.
Figure 13:
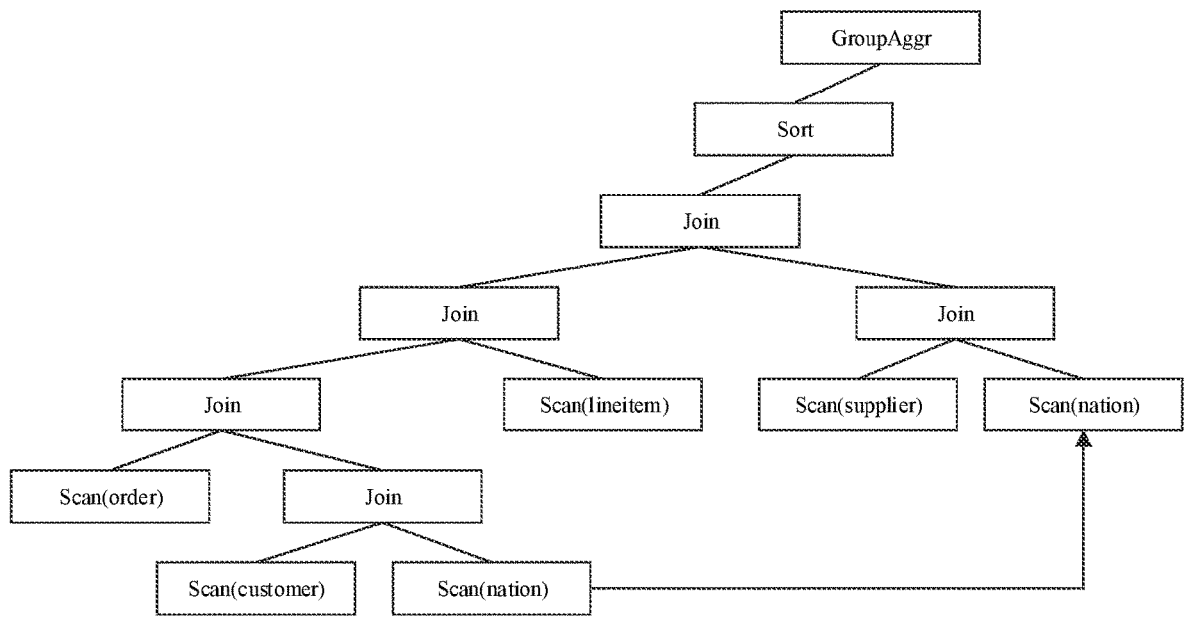
FIG. 13 illustrates a schematic diagram of the merged execution plan tree in embodiments of the present invention.

After the accelerated mapping by the accelerated mapping module, the execution plan tree is transformed into the execution plan tree shown in FIG. 12. Index scan and Seq Scan are mapped as unified Scan nodes, Hash Join, Nested Join are mapped as Join operations, and the Hash nodes under Hash join are removed; Gather Merge is also removed. Thus, the entire execution plan tree is remapped to a new execution plan tree matching the hardware accelerator. After the accelerated mapping module performs the optimization matching of nodes and output target columns, the execution plan tree is transformed into the execution plan tree shown in FIG. 13.

In this case, the scan node for nation will be optimized to the same node, i.e. it will be executed only once. By adding verbose to the execution plan, when the lineitem is scanned, the output columns include all columns, but the only columns that actually need to be used in the final output and subsequent nodes are only 6 columns such as l_orderkey, l_suppkey, l_shipdate, l_extendedprice, l_discount and l_year. Therefore, the accelerated mapping module will further optimize the output columns of each node, and the output column optimization code is shown in FIG. 14.

After the accelerated mapping module completes the generation of the new execution plan tree, the accelerated execution engine sends this new execution plan tree and related parameters to the hardware accelerator for execution. It can be sent for the entire new execution plan tree, one node at a time, or multiple nodes, as can be determined by the digital twin image of the hardware accelerator it holds.

Corresponding to a method for accelerating database operations in this application embodiment, this application embodiment also provides an device for accelerating database operations, applied to a database connected with a hardware accelerator, as shown in FIG. 15, device comprising:

an accelerated mapping module 501, for receiving an initial execution plan tree sent by the database that needs to be accelerated, processing the initial execution plan tree and generating a new execution plan tree based on the basic operation and accelerated resource supported by the hardware accelerator;

an accelerated execution engine module 502, for if the new execution cost of the new execution plan tree is less than the initial execution cost of the initial execution plan tree, distributing the new execution plan tree to the hardware accelerator for execution based on the organization approach and the operation approach of the hardware accelerator;

a determination module 503, for determining the result data after the hardware accelerator has accelerated the database operations based on the execution result returned by the hardware accelerator;

wherein the new execution cost and the initial execution cost are determined based on calling a preset cost function.

Finally, it should be noted that the above embodiments are only used to illustrate the technical solution of the present application, not to limit it; despite the detailed description of the present application with reference to the foregoing embodiments, a person of ordinary skill in the art should understand that: it is still possible to modify the technical solution recorded in the foregoing embodiments, or to replace some of the technical features with equivalent; and these modifications or replacements do not drive the corresponding technical solutions away from the spirit and scope of the technical solutions of the embodiments of the present application.

Although the invention has been illustrated and described in greater detail with reference to the exemplary embodiment, the invention is not limited to the examples disclosed, and further variations can be inferred by a person skilled in the conventional art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for accelerating database operation, applied to a database connected with a hardware accelerator, wherein the method comprising:

when receiving an initial execution plan tree sent by the database that needs to be accelerated, processing the initial execution plan tree and generating a new execution plan tree and a new execution cost based on a basic operation and accelerated resource supported by the hardware accelerator;

if the new execution cost of the new execution plan tree is less than an initial execution cost of the initial execution plan tree, distributing the new execution plan tree to the hardware accelerator for execution based on an organization approach and an operation approach of the hardware accelerator;

wherein the execution result is returned by the hardware accelerator to complete the accelerated operation of the database operation; and wherein the new execution cost and the initial execution cost are determined based on calling a preset cost function;

wherein processing the initial execution plan tree and generating a new execution plan tree based on the basic operation and accelerated resource supported by the hardware accelerator includes:

normalizing and mapping nodes in the initial execution plan tree that perform accelerated operation according to the basic operation, while also removing some of the nodes whose functions are integrated and then mapping some of the nodes after pre-processing, and then generating a matching execution plan tree that matches the hardware accelerator according to the results of the normalization mapping; and optimizing nodes and output target columns in the matching execution plan tree based on the accelerated resource and generating the new execution plan tree based on the optimization results.

2. The method according to the claim 1, wherein the normalizing and mapping comprises subsuming, and/or deleting, and/or adding nodes.

3. The method according to the claim 1, wherein optimizing nodes and output target columns in the matching execution plan tree based on the accelerated resource, includes:

determining, based on the accelerated resource, a manner in which the hardware accelerator accesses the required data, a manner in which each node performs data access, columns to be used for the final output and the successor nodes;

determining the nodes in the matching execution plan tree that can be executed concurrently based on the manner in which the hardware accelerator accesses the required data, and combining different execution nodes in the matching execution plan tree that perform access to the same data into a single execution action, and optimizing the output target column based on the columns to be used for the final output and successor nodes; and wherein the manner in which the hardware accelerator accesses the required data including access based on its own memory, or access to shared memory based on a cache coherency protocol, or access to remote storage nodes via the network.

4. The method according to the claim 1, wherein distributing the new execution plan tree to the hardware accelerator for execution based on the organization approach and the operation approach of the hardware accelerator includes:

according to a digital twin image corresponding to the organization approach and the operation approach, sending one or more of the new execution plan trees as a whole to the hardware accelerator for execution, or sending the new execution plan trees sequentially to the hardware accelerator by individual nodes for execution, or sending a combination of plurality of nodes in the new execution plan trees to the hardware accelerator for execution; and wherein the digital twin image includes a number of execution modules of the hardware accelerator, a number of executable function nodes, an attribution relationship of each executable function node and a schedulable execution granularity.

5. The method according to the claim 4, further comprising:

generating the digital twin image based on self information when initialization instructions are received and when self information including organization approach and operation approach is received from the hardware accelerator.

6. The method according to the claim 1, wherein the hardware accelerator is a plurality of hardware accelerators, each of the hardware accelerators being provided with a local storage unit, and that before determining the result data of the hardware accelerator after accelerating database operation based on the execution results returned by the hardware accelerator, the method further comprising:

adjusting a cache and final data of each of the plurality of hardware accelerators corresponding to the execution results, so that each the cache and each the final data are consistent, respectively.

7. The method according to the claim 1, wherein after processing the initial execution plan tree and generating a new execution plan tree and a new execution cost based on the basic operation and accelerated resource supported by the hardware accelerator, the method further comprising:

if the new execution cost is not less than the initial execution cost, executing the initial execution plan tree based on the database, and determining the result of the database operation based on the execution result.

8. A hardware acceleration device for accelerating database operation, applied to a database connected with a hardware accelerator, wherein the device comprises:

an accelerated mapping module, for receiving an initial execution plan tree sent by the database that needs to be accelerated, processing the initial execution plan tree and generating a new execution plan tree based on the basic operation and accelerated resource supported by the hardware accelerator;

an accelerated execution engine module, for if the new execution cost of the new execution plan tree is less than the initial execution cost of the initial execution plan tree, distributing the new execution plan tree to the hardware accelerator for execution based on an organization approach and an operation approach of the hardware accelerator; and an accelerated storage engine module, for completing memory and external memory management of the accelerated portion, and coordinating cache and final data consistency among a plurality of hardware accelerators, including the hardware accelerator, wherein processing the initial execution plan tree and generating the new execution plan tree based on the basic operation and accelerated resource supported by the hardware accelerator, specifically:

normalizing and mapping nodes in the initial plan tree that perform accelerated operation according to the basic operation, while also removing some of the nodes whose functions are integrated and then mapping some of the nodes after pre-processing, and then generating a matching execution plan tree that matches the hardware accelerator according to the results of the normalization mapping;

optimizing nodes and output target columns in the matching execution plan tree based on the accelerated resource and generating the new execution plan tree based on the optimization results.

9. A non-transitory computer-readable storage medium, wherein the computer-readable storage medium has instructions stored in it, when the instructions are run on the a terminal device, causing the terminal device to execute a method for accelerating database operation as claimed in claim 1.

* * * * *